United States Patent
Kim et al.

(10) Patent No.: US 8,802,804 B2
(45) Date of Patent: Aug. 12, 2014

(54) HYDROXY-TERMINATED SILOXANE, POLYSILOXANE-POLYCARBONATE COPOLYMER, AND PREPARATION METHOD THEREOF

(75) Inventors: Sun Mi Kim, Daejeon (KR); Jae Hyun Kim, Seoul (KR); Kyung Moo Shin, Gyeongsangbuk-do (KR); Sung Hwan Cho, Daejeon (KR); Whan Gi Kim, Chungcheongbuk-do (KR); Dong Wan Seo, Chungcheongbuk-do (KR)

(73) Assignee: Samyang Corporation, Seoul (KR)

( * ) Notice: Subject to any disclaimer, the term of this patent is extended or adjusted under 35 U.S.C. 154(b) by 77 days.

(21) Appl. No.: 13/578,080

(22) PCT Filed: Feb. 23, 2011

(86) PCT No.: PCT/KR2011/001254
§ 371 (c)(1),
(2), (4) Date: Aug. 9, 2012

(87) PCT Pub. No.: WO2011/122767
PCT Pub. Date: Oct. 6, 2011

(65) Prior Publication Data
US 2012/0309922 A1    Dec. 6, 2012

(30) Foreign Application Priority Data

Mar. 29, 2010  (KR) .................... 10-2010-0027893

(51) Int. Cl.
*C08G 77/14*    (2006.01)
*C07F 7/08*    (2006.01)

(52) U.S. Cl.
USPC .............................................. 528/25; 556/440

(58) Field of Classification Search
CPC .................................. C08G 77/14; C07F 7/08
See application file for complete search history.

(56) References Cited

U.S. PATENT DOCUMENTS

| | | | |
|---|---|---|---|
| 5,380,795 A | 1/1995 | Gosens et al. | |
| 5,455,310 A | 10/1995 | Hoover et al. | |
| 5,608,026 A | 3/1997 | Hoover et al. | |
| 6,072,011 A | 6/2000 | Hoover | |
| 7,491,346 B2* | 2/2009 | Hikosaka | 252/501.1 |
| 7,572,842 B2* | 8/2009 | Zech et al. | 523/109 |

FOREIGN PATENT DOCUMENTS

| | | |
|---|---|---|
| JP | 3-79626 A | 4/1991 |
| JP | 5-222173 A | 8/1993 |
| JP | 6-263865 A | 9/1994 |
| JP | 6-279669 A | 10/1994 |
| JP | 7-53702 A | 2/1995 |

OTHER PUBLICATIONS

International Search Report issued in PCT/KR2011/001254 mailed on Nov. 22, 2011.

* cited by examiner

*Primary Examiner* — Robert S Loewe
(74) *Attorney, Agent, or Firm* — Birch, Stewart, Kolasch & Birch, LLP

(57) ABSTRACT

Provided are a hydroxy-terminated siloxane, a polysiloxane-polycarbonate copolymer including same as a repeating unit, and a preparation method thereof. The hydroxyl-terminated siloxane has the structure of chemical formula 1.

10 Claims, No Drawings

HYDROXY-TERMINATED SILOXANE, POLYSILOXANE-POLYCARBONATE COPOLYMER, AND PREPARATION METHOD THEREOF

TECHNICAL FIELD

The present invention relates to a hydroxy-terminated siloxane and a polysiloxane-polycarbonate copolymer. More specifically, the present invention relates to a hydroxy-terminated siloxane having ester linkage or urethane linkage, a polysiloxane-polycarbonate copolymer comprising said hydroxy-terminated siloxane having ester linkage or urethane linkage as a repeating unit, and a preparation method thereof.

BACKGROUND ART

Polycarbonate has good mechanical properties such as tensile strength, impact resistance, etc. and also has good dimension stability, heat resistance, optical transparency, etc. Thus, it has many industrial applications. However, although polycarbonate has good impact resistance at room temperature, its impact resistance rapidly becomes worse at low temperature. To improve such a disadvantage, various copolymers have been researched and it has been known that polysiloxane-polycarbonate copolymer has good impact resistance at low temperature.

Although the polysiloxane-polycarbonate copolymers produced by conventional methods have good impact resistance at low temperature, they are vulnerable to heat deformation at high temperature, and the transparency becomes lower. Thus, there is a limitation in the use of such copolymers as an optical material. In addition, they have poor resistance to scratch and abrasion, and thus when used as an exterior material, they show poor quality. In order to improve the resistance to abrasion, mixing of polysiloxane-polycarbonate copolymer with another polymer was tried, but such a mixing resulted in deterioration of other properties such as transparency, etc.

DETAILED DESCRIPTION

Technical Purpose

The present invention is intended to solve the problems involved in the prior arts as stated above. The technical purpose of the present invention is to provide a polysiloxane-polycarbonate copolymer having excellent heat resistance, impact resistance at low temperature, transparency and abrasion resistance and a preparation method thereof, and in addition, a hydroxy-terminated siloxane which can be used in preparing the polysiloxane-polycarbonate copolymer.

Technical Solution

The present invention provides a hydroxy-terminated siloxane of the following chemical formula 1.

In the above chemical formula 1,
$R_1$ independently represents hydrogen atom, halogen atom, hydroxy group,
alkyl group, alkoxy group or aryl group,
$R_2$ independently represents hydrocarbon group having a carbon number of 1 to 13 or hydroxy group,
$R_3$ independently represents alkylene group having a carbon number of 2 to 8,
A is X or NH—X—NH, where X represents linear or branched aliphatic group having a carbon number of 1 to 20, cycloalkylene group, or mono- or polycyclic arylene group that has a carbon number of 6 to 30 and is unsubstituted or substituted with halogen atom, alkyl group, alkoxy group, aryl group or carboxy group,
m independently represents an integer of 0 to 4, and
n independently represents an integer of 2 to 1,000.

In another aspect, the present invention provides a polysiloxane-polycarbonate copolymer comprising, as repeating units, the above hydroxy-terminated siloxane having ester linkage or urethane linkage, and a polycarbonate block of the following chemical formula 3.

[Chemical formula 3]

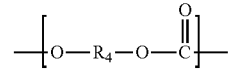

In the above chemical formula 3,
$R_4$ independently represents aromatic hydrocarbon group having a carbon number of 6 to 30 that is unsubstituted or substituted with alkyl group, cycloalkyl group, alkenyl group, alkoxy group, halogen atom or nitro.

In another aspect, the present invention provides a method for preparing a polysiloxane-polycarbonate copolymer, the method comprising: a step of reacting the above hydroxy-terminated siloxane having ester linkage or urethane linkage and an oligomeric polycarbonate under an interfacial reaction condition to form a polysiloxane-polycarbonate intermediate; and a step of polymerizing said intermediate by using a first polymerization catalyst.

Advantageous Effects

By containing siloxane having ester linkage or urethane linkage, the polysiloxane-polycarbonate copolymer according to the present invention can secure excellent mechanical properties such as heat resistance, impact resistance at low temperature, abrasion resistance, etc. while maintaining excellent transparency, and thus can be used in various applications such as helmet, automobile parts, cell phone housing, etc.

MODE FOR INVENTION

Hereinafter, the present invention will be described more specifically. The purpose, features and advantages of the

[Chemical formula 1]

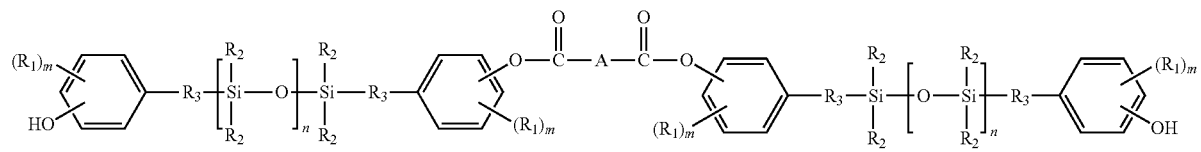

present invention will be easily understood through the following embodiments. The present invention is not limited to the embodiments as explained herein and may be manifested in other forms. The embodiments introduced herein are provided in order to make the disclosed contents thorough and complete, and to convey the spirit of the present invention sufficiently to a person skilled in the art. Thus, the present invention is not limited to the following embodiments.

The term "reaction product" as used herein means a substance that is formed by reacting two or more reactants.

In addition, although the terms "first," "second" and the like are used herein for the description of polymerization catalysts, the polymerization catalysts are not limited by these terms. These terms are just used to distinguish the polymerization catalysts from each other. For example, a first polymerization catalyst and a second polymerization catalyst may be of the same kind of catalyst or different kinds of catalyst.

Furthermore, in the chemical formulas described herein, although the English character "R" used for representing hydrogen, halogen atom and/or hydrocarbon group, etc. has a numerical subscript, "R" is not limited by such a subscript. "R" independently represents hydrogen, halogen atom and/or hydrocarbon group, etc. For example, even if two or more "R"s have the same numerical subscript, such "R"s may represent the same hydrocarbon group or different hydrocarbon groups. Also, even if two or more "R"s have different numerical subscripts, such "R"s may represent the same hydrocarbon group or different hydrocarbon groups.

<Hydroxy-Terminated Siloxane Having Ester Linkage>

According to the first preferred embodiment of the present invention, a hydroxy-terminated siloxane having ester linkage, a polysiloxane-polycarbonate copolymer comprising the hydroxy-terminated siloxane as a repeating unit, and a preparation method thereof are provided.

The hydroxy-terminated siloxane according to the first preferred embodiment of the present invention can be a compound of the following chemical formula 1a.

carbon number of 2 to 8. The subscript "m" may independently represent an integer of 0 to 4. The subscript "n" may independently represent an integer of 2 to 1,000, preferably an integer of 2 to 500, and more preferably an integer of 5 to 100. X may represent linear or branched aliphatic group having a carbon number of 1 to 20, cycloalkylene group, or mono- or polycyclic arylene group that has a carbon number of 6 to 30 and is unsubstituted or substituted with halogen atom, alkyl group, alkoxy group, aryl group or carboxy group. For example, X may be an aliphatic group that is unsubstituted or substituted with halogen atom, an aliphatic group that comprises oxygen, nitrogen or sulfur atom in the main chain, or an arylene group that can be derived from bisphenol A, resorcinol, hydroquinone or diphenylphenol and can be represented, for example, by the following chemical formulas 5a to 5h.

[Chemical formula 5a]

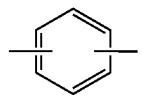

[Chemical formula 5b]

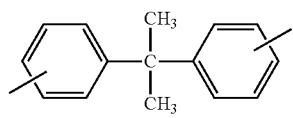

[Chemical formula 5c]

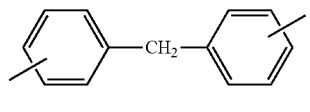

[Chemical formula 5d]

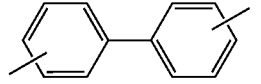

[Chemical formula 1a]

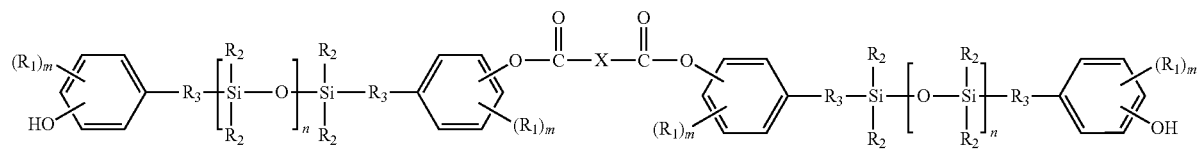

In the above chemical formula 1a, $R_1$ may independently represent hydrogen atom, halogen atom, hydroxy group, alkyl group, alkoxy group or aryl group. For example, the halogen atom may be Cl or Br, and the alkyl group may be an alkyl group having a carbon number of 1 to 13 such as methyl, ethyl or propyl group. In addition, for example, the alkoxy group may be an alkoxy group having a carbon number of 1 to 13 such as methoxy, ethoxy or propoxy group, and the aryl group may be an aryl group having a carbon number of 6 to 10 such as phenyl, chlorophenyl or tolyl group. $R_2$ may independently represent hydrocarbon group having a carbon number of 1 to 13 or hydroxy group. For example, $R_2$ may be alkyl or alkoxy group having a carbon number of 1 to 13, alkenyl or alkenyloxy group having a carbon number of 2 to 13, cycloalkyl or cycloalkoxy group having a carbon number of 3 to 6, aryloxy group having a carbon number of 6 to 10, aralkyl or aralkoxy group having a carbon number of 7 to 13, or alkaryl or alkaryloxy group having a carbon number of 7 to 13. $R_3$ may independently represent alkylene group having a -continued

[Chemical formula 5e]

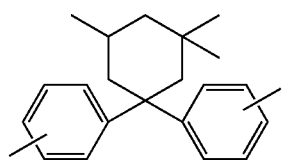

[Chemical formula 5f]

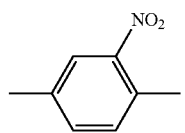

-continued

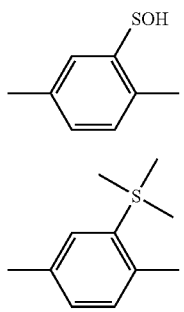
[Chemical formula 5g]

[Chemical formula 5h]

The hydroxy-terminated siloxane may be a reaction product of a hydroxy-terminated siloxane of the following chemical formula 2 with an acyl compound.

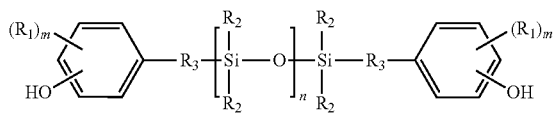
[Chemical formual 2]

In the above chemical formula 2, $R_1$, $R_2$, $R_3$, m and n are the same as defined in chemical formula 1a above. The hydroxy-terminated siloxane of the above chemical formula 2 may be prepared, for example, by synthesizing a compound of the following chemical formula 2a having hydroxy group and double bond, and a compound of the following chemical formula 2b containing silicon by using platinum catalyst in a molar ratio of 2:1.

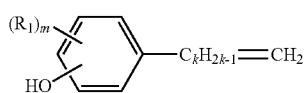
[Chemical formula 2a]

In the above chemical formula 2a, $R_1$ and m are the same as defined in chemical formula 1a above, and k may represent an integer of 1 to 7

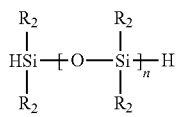
[Chemical formula 2b]

In the above chemical formula 2b, $R_2$ and n are the same as defined in chemical formula 1a above.

Regarding the preparation of the hydroxy-terminated siloxane of the above chemical formula 2, U.S. Pat. No. 6,072,011 may be referred to.

The acyl compound may have, for example, an aromatic structure, an aliphatic structure, or a mixed structure comprising both aromatic and aliphatic forms. When the acyl compound is of an aromatic structure or a mixed structure, it can have a carbon number of 6 to 30, and when the acyl compound is of an aliphatic structure, it can have a carbon number of 1 to 20. The acyl compound may further comprise halogen, oxygen, nitrogen or sulfur atom.

For example, the acyl compound may be a compound of the following chemical formula 6.

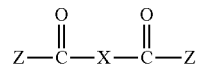
[Chemical formula 6]

In the above chemical formula 6, Z may represent hydroxy group or halogen group, and X is the same as defined in chemical formula 1a above.

<Hydroxy-Terminated Siloxane Having Urethane Linkage>

According to the second preferred embodiment of the present invention, a hydroxy-terminated siloxane having urethane linkage, a polysiloxane-polycarbonate copolymer comprising the hydroxy-terminated siloxane as a repeating unit, and a preparation method thereof are provided.

The hydroxy-terminated siloxane according to the second preferred embodiment of the present invention can be a compound of the following chemical formula 1b.

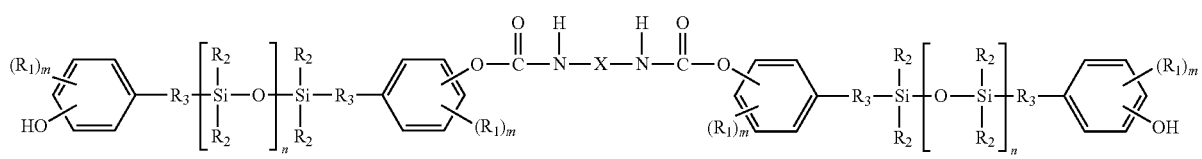
[Chemical formula 1b]

In the above chemical formula 1b, $R_1$, $R_2$, $R_3$, m and n are the same as defined in chemical formula 1a above, and X may represent linear or branched aliphatic group having a carbon number of 1 to 20, cycloalkylene group (for example, cycloalkylene group having a carbon number of 3 to 6), or mono- or polycyclic arylene group that has a carbon number of 6 to 30 and is unsubstituted or substituted with halogen atom, alkyl group, alkoxy group, aryl group or carboxy group. For example, X may be an aliphatic group that is unsubstituted or substituted with halogen atom, an aliphatic group that comprises oxygen, nitrogen or sulfur atom in the main chain, or an arylene group that can be derived from bisphenol A, resorcinol, hydroquinone or diphenylphenol and can be represented, for example, by chemical formulas 5a to 5h as explained above.

The hydroxy-terminated siloxane may be a reaction product of a hydroxy-terminated siloxane of chemical formula 2 as defined above with a diisocyanate compound of the following chemical formula 4.

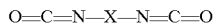
[Chemical formula 4]

In the above chemical formula 4, X is the same as defined in chemical formula 1b above.

The diisocyanate compound may be, for example, 1,4-phenylenediisocyanate, 1,3-phenylenediisocyanate or 4,4'-methylenediphenyl diisocyanate.

<Polysiloxane-Polycarbonate Copolymer>

The polysiloxane-polycarbonate copolymer according to the first and second preferred embodiments of the present invention may comprise, as repeating units, the siloxane group of chemical formula 1 above, preferably each of chemical formulas 1a and 1b above, and a polycarbonate block of the following chemical formula 3.

[Chemical formula 3]

In the above chemical formula 3, $R_4$ may represent aromatic hydrocarbon group having a carbon number of 6 to 30 that is unsubstituted or substituted with alkyl group (for example, alkyl group having a carbon number of 1 to 13), cycloalkyl group (for example, cycloalkyl group having a carbon number of 3 to 6), alkenyl group (for example, alkenyl group having a carbon number of 2 to 13), alkoxy group (for example, alkoxy group having a carbon number of 1 to 13), halogen atom or nitro.

The aromatic hydrocarbon group may be derived from a compound having the following chemical formula 3a.

[Chemical formula 3a]

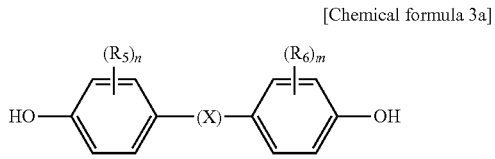

In the above chemical formula 3a, X may represent alkylene group; linear, branched or cyclic alkylene group having no functional group; or linear, branched or cyclic alkylene group comprising functional group such as sulfide, ether, sulfoxide, sulfone, ketone, naphthyl, isobutylphenyl, etc. Preferably, X may be linear or branched alkylene group having a carbon number of 1 to 10, or cyclic alkylene group having a carbon number of 3 to 6. $R_5$ and $R_6$ may independently represent hydrogen atom, halogen atom or alkyl group—for example, linear or branched alkyl group having a carbon number of 1 to 10, or cyclic alkyl group having a carbon number of 3 to 6. The subscripts "n" and "m" may independently represent an integer of 0 to 4.

The compound of the above chemical formula 3a may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenylether[bis(4-hydroxyphenyl) ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl) ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl) cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl) isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl) methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis (3-chloro-4-hydroxyphenyl)sulfone, bis(4-hydroxyphenyl) sulfide, bis(4-hydroxyphenyl)sulfoxide, bis(3-methyl-4-hydroxyphenyl)sulfide, bis(3,5-dimethyl-4-hydroxyphenyl) sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene or 2,6-dihydroxynaphthalene, but is not limited thereto. Among them, the representative one is 2,2-bis(4-hydroxyphenyl)propane (bisphenol A). For other functional phenols, U.S. Pat. Nos. 2,999,835, 3,028,365, 3,153,008 and 3,334,154 may be referred to. The above divalent phenols may be used alone or in combination with other(s).

Carbonate precursor is another monomer of polycarbonate resin. For example, carbonyl chloride (phosgene), carbonyl bromide, bishaloformate, diphenylcarbonate or dimethylcarbonate, etc. may be used.

In the polysiloxane-polycarbonate copolymer, the amount of the hydroxy-terminated siloxane may be about 0.5 to 20% by weight and the amount of the polycarbonate may be about 80 to 99.5% by weight. If the amount of the hydroxy-terminated siloxane is less than 0.5% by weight, the abrasion resistance may be lowered. If the amount of the hydroxy-terminated siloxane is greater than 20% by weight, the abrasion resistance is good but the transparency may be lowered.

The polysiloxane-polycarbonate copolymer may have a viscosity average molecular weight of from 15,000 to 150,000. If the viscosity average molecular weight is less than 15,000, the mechanical properties may be lowered remarkably. If the viscosity average molecular weight is greater than 150,000, there may be a problem in processing the resin due to the increase of melting viscosity.

The polysiloxane-polycarbonate copolymer of the present invention may be prepared through a step of reacting the hydroxy-terminated siloxane having ester linkage or urethane linkage, and an oligomeric polycarbonate under an interfacial reaction condition to form a polysiloxane-polycarbonate intermediate; and a step of polymerizing said intermediate by using a first polymerization catalyst.

In an embodiment, the step to form said intermediate may comprise a step of mixing said hydroxy-terminated siloxane and said oligomeric polycarbonate in a weight ratio of 0.5: 99.5 to 20:80.

The polycarbonate used in the preparation of the polysiloxane-polycarbonate copolymer may be an oligomeric polycarbonate having a viscosity average molecular weight of from 800 to 5,000. The oligomeric polycarbonate may be prepared by adding the above divalent phenol compound in an aqueous alkali solution to make a phenol salt state, and then adding the phenol compound of the phenol salt state in dichloromethane in which phosgene gas is injected. To prepare the oligomer, it is preferable to maintain the molar ratio of phosgene to bisphenol within a range of about 1:1 to 1.5:1. For example, the molar ratio of phosgene to bisphenol may be about 1:1 to 1.2:1.

The above oligomer-forming reaction may be conducted generally at a temperature range of about 15 to 60° C. In order to adjust the pH of the reaction mixture, alkali metal hydroxide may be utilized. The alkali metal hydroxide may be, for example, sodium hydroxide.

In an embodiment, the step to form said intermediate may comprise a step of forming a mixture comprising said hydroxy-terminated siloxane and said oligomeric polycarbonate, and the mixture may further comprise a phase transfer catalyst, a molecular weight control agent and a second polymerization catalyst. In addition, the step to form said intermediate may comprise a step of forming a mixture comprising said hydroxy-terminated siloxane and said oligomeric polycarbonate; and after the reaction of said hydroxy-terminated siloxane and said oligomeric polycarbonate is completed, a step of extracting an organic phase from the resulting mixture; and the step of polymerizing said intermediate may comprise a step of providing said first polymerization catalyst to the extracted organic phase.

Concretely, the polysiloxane-polycarbonate copolymer according to the present invention may be prepared by adding the hydroxy-terminated siloxane having ester linkage or urethane linkage to an organic phase-aqueous phase mixture containing the polycarbonate, and subsequently feeding a molecular weight control agent and a catalyst.

As for the molecular weight control agent, a monofunctional compound which is similar to a monomer used in preparation of polycarbonate may be used. The monofunctional compound may be, for example, a derivative based on phenol such as p-isopropylphenol, p-tert-butylphenol (PTBP), p-cumylphenol, p-octylphenol and p-isononylphenol, or an aliphatic alcohol. Preferably, p-tert-butylphenol (PTBP) may be used.

As for the catalyst, a polymerization catalyst and/or a phase transfer catalyst may be used. The polymerization catalyst may be, for example, triethylamine (TEA) and the phase transfer catalyst may be a compound having the following chemical formula 7.

(R$_7$)$_4$Q$^+$T$^-$     [Chemical formula 7]

In the above chemical formula 7, R$_7$ may independently represent alkyl group having a carbon number of 1 to 10, Q may represent nitrogen or phosphorus, and T may represent halogen atom or —OR$_8$ wherein R$_8$ may represent hydrogen atom, alkyl group having a carbon number of 1 to 18 or aryl group having a carbon number of 6 to 18.

The phase transfer catalyst may be, for example, [CH$_3$(CH$_2$)$_3$]$_4$NT, [CH$_3$(CH$_2$)$_3$]$_4$PT, [CH$_3$(CH$_2$)$_5$]$_4$NT, [CH$_3$(CH$_2$)$_6$]$_4$NT, [CH$_3$(CH$_2$)$_4$]$_4$NT, CH$_3$[CH$_3$(CH$_2$)$_3$]$_3$NT or CH$_3$[CH$_3$(CH$_2$)$_2$]$_3$NT, wherein T may be Cl, Br or —OR$_8$ where R$_8$ may be hydrogen atom, alkyl group having a carbon number of 1 to 18 or aryl group having a carbon number of 6 to 18.

The amount of the phase transfer catalyst is preferably about 0.01 to 10% by weight. If the amount of the phase transfer catalyst is less than 0.01% by weight, the reactivity may be lowered. If the amount of the phase transfer catalyst is greater than 10% by weight, precipitate may be generated or the transparency may be lowered.

In an embodiment, after the polysiloxane-polycarbonate copolymer is prepared, the organic phase dispersed in methylene chloride is washed with alkali and then separated. Subsequently, the organic phase is washed with 0.1 N solution of hydrochloric acid and then rinsed with distilled water 2 or 3 times repeatedly.

After the rinse is completed, the concentration of the organic phase dispersed in methylene chloride is adjusted constantly and then granulated by using a constant amount of pure water in a range of 30 to 100° C., preferably 60 to 80° C. If the temperature of the pure water is lower than 30° C., the granulation rate is slow and thus the granulation time may be too long. If the temperature of the pure water is higher than 100° C., it may be difficult to obtain uniformly sized polycarbonate morphology. After the granulation is completed, it is preferable to dry the product at 100 to 120° C. for 5 to 10 hours.

Examples 1 to 7 and Comparative Examples 1 to 3

Preparation of Hydroxy-Terminated Siloxane Having Ester Linkage

Example 1

In a 500 mL three-necked flask equipped with a condenser, 0.4 mol of monomer (BY16-799, Dow Corning) was dissolved in 300 mL of chloroform, and then 67 mL of triethylamine (TEA) catalyst was added thereto. With refluxing the resulting solution, 0.2 mol of terephthaloylchloride (TCL) dissolved in 1,000 mL of chloroform was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having ester linkage of the following chemical formula 8 was prepared. The synthesis was confirmed by H-NMR analysis wherein the peak of methylene group of the polysiloxane was observed at 2.6 ppm, the peak of hydrogen of benzene ring of TCL was observed at 8.35 ppm and the peak of hydrogen of benzene ring of the polysiloxane was observed at 6.75-7.35 ppm.

[Chemical formula 8]

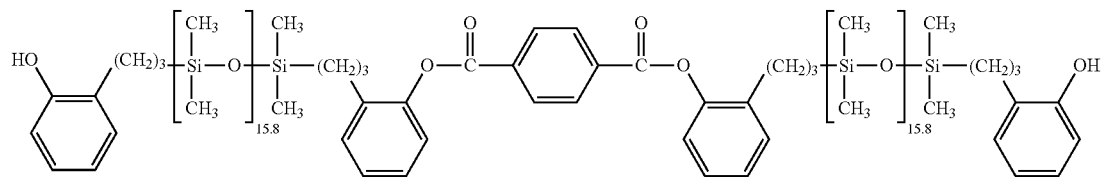

Preparation of Polysiloxane-Polycarbonate Copolymer

Example 2

Interfacial reaction of bisphenol A in an aqueous solution and phosgene gas was conducted in the presence of methylene chloride to prepare 400 mL of an oligomeric polycarbonate mixture having a viscosity average molecular weight of about 1,000. To the obtained oligomeric polycarbonate mixture, 1% by weight of the hydroxy-terminated siloxane having ester linkage prepared in Example 1 which was dissolved in methylene chloride, 1.8 mL of tetrabutylammonium chloride (TBACl), 1.5 g of p-tert-butylphenol (PTBP) and 275 μl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 360 g of methylene chloride and 300 μl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times repeatedly. After the rinse was completed, the concentration of the organic phase was adjusted constantly and then granulated by using a constant amount of pure water at 76° C. After the granulation was completed, the product was dried first at 110° C. for 8 hours and second at 120° C. for 10 hours. The properties of the prepared polysiloxane-polycarbonate copolymer were measured and are shown in the following Table 1. The synthesis of the copolymer was confirmed by H-NMR analysis wherein the peaks of methylene group of the polysiloxane were observed at 2.6 ppm and 2.65 ppm, the peak of hydrogen of benzene ring of TCL was observed at 8.35 ppm, and the peak of hydrogen of benzene ring of the polysiloxane was observed at 6.95-7.5 ppm.

Example 3

With using 5% by weight of the hydroxy-terminated siloxane having ester linkage prepared in Example 1, the polysiloxane-polycarbonate copolymer was prepared by the same method as that of Example 2. The properties of the prepared polysiloxane-polycarbonate copolymer were measured and are shown in the following Table 1.

Example 4

With using 7% by weight of the hydroxy-terminated siloxane having ester linkage prepared in Example 1, the polysiloxane-polycarbonate copolymer was prepared by the same method as that of Example 2. The properties of the prepared polysiloxane-polycarbonate copolymer were measured and are shown in the following Table 1.

Example 5

With using 10% by weight of the hydroxy-terminated siloxane having ester linkage prepared in Example 1, the polysiloxane-polycarbonate copolymer was prepared by the same method as that of Example 2. The properties of the prepared polysiloxane-polycarbonate copolymer were measured and are shown in the following Table 1.

Example 6

With using 15% by weight of the hydroxy-terminated siloxane having ester linkage prepared in Example 1, the polysiloxane-polycarbonate copolymer was prepared by the same method as that of Example 2. The properties of the prepared polysiloxane-polycarbonate copolymer were measured and are shown in the following Table 1.

Example 7

With using 5% by weight of the hydroxy-terminated siloxane having ester linkage prepared in Example 1 and 0.6 g of p-tert-butylphenol (PTBP), the polysiloxane-polycarbonate copolymer having a viscosity average molecular weight of 71,200 was prepared by the same method as that of Example 2. The properties of the prepared polysiloxane-polycarbonate copolymer were measured and are shown in the following Table 1.

Comparative Example 1

The properties of a linear polycarbonate having a viscosity average molecular weight of 31,200 (3030IR, Samyang Corporation) were measured and are shown in the following Table 1.

Comparative Example 2

Without using the hydroxy-terminated siloxane having ester linkage and with using 0.6 g of p-tert-butylphenol (PTBP), a linear polycarbonate having a viscosity average molecular weight of 70,800 was prepared by the same method as that of Example 2. The properties of the prepared polycarbonate resin were measured and are shown in the following Table 1.

Comparative Example 3

With using 5% by weight of the siloxane of the following chemical formula 9 (BY16-752 monomer, Dow Corning), a polysiloxane-polycarbonate copolymer was prepared by the same method as that of Example 2. The properties of the prepared polysiloxane-polycarbonate copolymer were measured and are shown in the following Table 1. The synthesis of the copolymer was confirmed by H-NMR analysis wherein the peak of methylene group of the polysiloxane was observed at 3.1 ppm and the peak of hydrogen of benzene ring of the polysiloxane was observed at 6.75-7.35 ppm.

[Chemical formula 9]

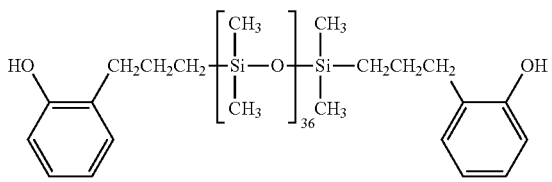

TABLE 1

| Properties | | Examples | | | | | | Comparative Examples | | |
|---|---|---|---|---|---|---|---|---|---|---|
| | | 2 | 3 | 4 | 5 | 6 | 7 | 1 | 2 | 3 |
| Siloxane amount (wt %) | | 1 | 5 | 7 | 10 | 15 | 5 | 0 | 0 | 5 |
| Viscosity average molecular weight (Mv) | | 31,000 | 30,200 | 30,700 | 29,800 | 30,600 | 71,200 | 31,200 | 70,800 | 30,500 |
| Impact strength (kgcm/cm) | Room temperature | 83 | 84 | 86 | 86 | 82 | 91 | 85 | 92 | 82 |
| | −50° C. | 37 | 64 | 72 | 73 | 65 | 70 | 20 | 35 | 59 |
| Transmittance (%) | | 90 | 85 | 83 | 80 | 74 | 88 | 92 | 91 | 73 |
| Haze (%) | | 2 | 20 | 24 | 31 | 38 | 8 | 1 | 1 | 40 |
| HDT (° C.) | | 145 | 142 | 140 | 139 | 137 | 143 | 147 | 149 | 135 |

As shown in Table 1 above, the polysiloxane having ester linkage-polycarbonate copolymers prepared according to Examples 2 to 7 had much better properties than the polycarbonate resins and polysiloxane-polycarbonate copolymer prepared according to Comparative Examples 1 to 3. Furthermore, they showed excellent transparency and heat resistance, as compared with the polysiloxane-polycarbonate copolymer prepared in Comparative Example 3 by using the hydroxy-terminated siloxane of the above chemical formula 9.

Examples 9 to 26 and Comparative Examples 4 and 5

Preparation of Hydroxy-Terminated Siloxane

Preparation Example 8

In a 100 mL three-necked flask equipped with a condenser, 5 g (0.03 mol) of eugenol and 17.66 g (0.015 mol) of polydimethylsiloxane were dissolved in 50 mL of chlorobenzene under nitrogen atmosphere. After the dissolution was completed, 0.03 g (0.00364 mmol) of platinum catalyst (platinum (0)-1,3-divinyl-1,1,3,3-tetramethyldisiloxane complex) was added thereto and the mixture was refluxed for 24 hours. After the solvent was removed from the reaction solution, washing was conducted with distilled water. The hydroxy-terminated siloxane of the following chemical formula 10 was prepared thereby.

[Chemical formula 10]

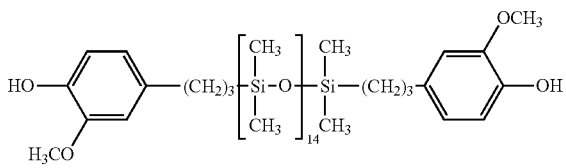

Preparation of Hydroxy-Terminated Siloxane Having Urethane Linkage

Example 9

In a 100 mL three-necked flask equipped with a condenser, 2.2 mmol of hydroxy-terminated siloxane synthesized in Preparation Example 8 above was completely dissolved in 20 mL of chloroform under nitrogen atmosphere and to the solution at 60° C., a mixture solution of 1.1 mmol of 1,4-phenylenediisocyanate (PDI) and 20 mL of chloroform was slowly added by using a dropping funnel To the resulting mixture solution, a small amount of dibutyl tin dilaurate (DBTL) was added and the refluxing was conducted for 24 hours. After the solvent removal, the washing was conducted by using distilled water. The hydroxy-terminated siloxane of the following chemical formula 11a having urethane linkage was prepared thereby. The synthesis was confirmed by H-NMR analysis wherein the peaks of methylene group and methoxy group of the polysiloxane were observed at 2.55 ppm and 3.8 ppm, respectively, the peak of hydrogen of benzene ring of the polysiloxane was observed at 6.65-6.8 ppm and the peaks of hydrogen of benzene ring of PDI were observed at 7.0 ppm and 7.4 ppm.

[Chemical formula 11a]

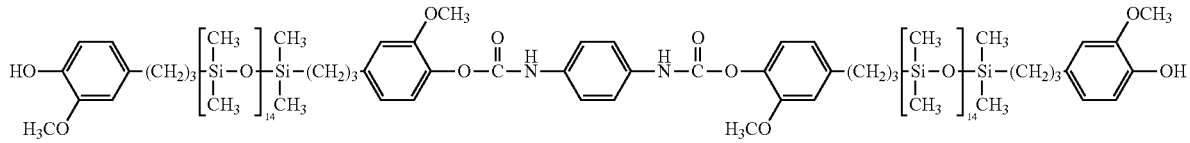

Example 10

According to the same method as Example 9 above, 2.2 mmol of hydroxy-terminated siloxane synthesized in Preparation Example 8 above was completely dissolved in 20 mL of chloroform and to the solution at 60° C., a mixture solution of 1.1 mmol of 1,3-phenylenediisocyanate and 20 mL of chloroform was slowly added by using a dropping funnel. To the resulting mixture solution, a small amount of dibutyl tin dilaurate (DBTL) was added and the refluxing was conducted for 24 hours. After the solvent removal, washing was conducted by using distilled water. The hydroxy-terminated siloxane of the following chemical formula 11b having urethane linkage was prepared thereby.

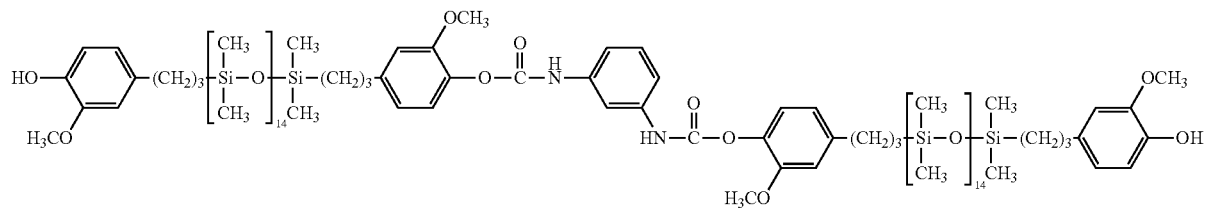

[Chemical formula 11b]

Example 11

According to the same method as Example 9 above, 2.2 mmol of hydroxy-terminated siloxane synthesized in Preparation Example 8 above was completely dissolved in 20 mL of chloroform and to the solution at 60° C., a mixture solution of 1.1 mmol of 4,4'-methylenediphenyl diisocyanate and 20 mL of chloroform was slowly added by using a dropping funnel. To the resulting mixture solution, a small amount of dibutyl tin dilaurate (DBTL) was added and the refluxing was conducted for 24 hours. After the solvent removal, washing was conducted by using distilled water. The hydroxy-terminated siloxane of the following chemical formula 11c having urethane linkage was prepared thereby.

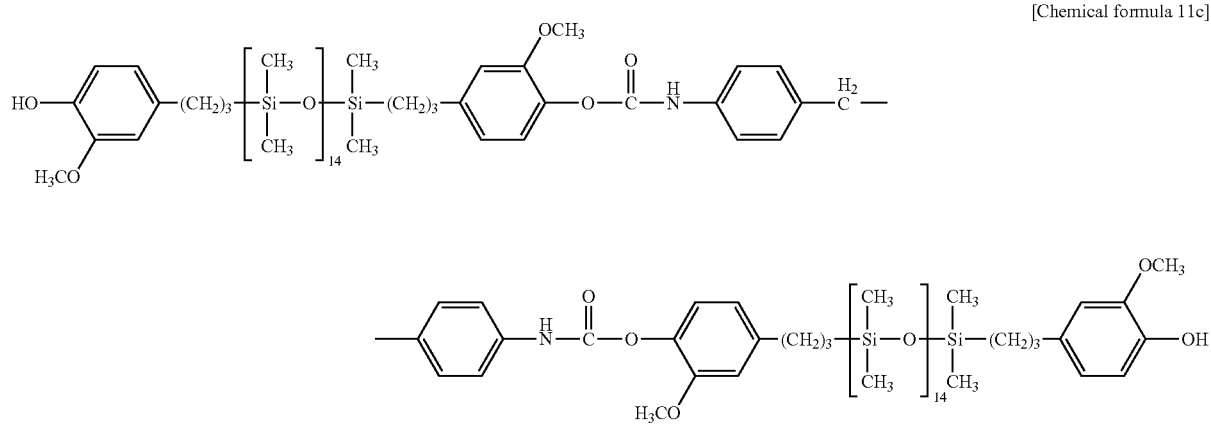

[Chemical formula 11c]

Example 12

Under nitrogen condition, 0.0666 mol of monomer (BY16-799, Dow Corning) was dissolved in 100 mL of benzene, and then 6.66 mmol of 1,4-diazabicyclo[2,2,2]-octane was added thereto. With refluxing the resulting solution, 0.0333 mol of 4,4'-methylenediphenyl diisocyanate dissolved in 200 mL of benzene was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having urethane linkage of the following chemical formula 11d was prepared. The synthesis was confirmed by H-NMR analysis wherein the peak of hydrogen bound to the first carbon of the aliphatic chain adjacent to the terminal phenyl group in the following chemical formula 11d was observed at 2.75 ppm.

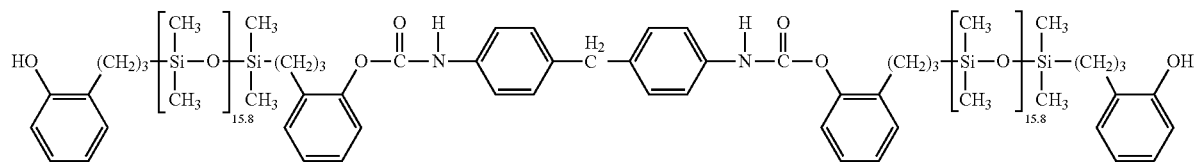

[Chemical formula 11d]

Example 13

According to the same method as Example 12 above, under nitrogen condition 0.0333 mol of monomer (BY16-752, Dow Corning) was dissolved in 100 mL of benzene, and then 3.33 mmol of 1,4-diazabicyclo[2,2,2]-octane was added thereto. With refluxing the resulting solution, 0.0166 mol of 4,4'-methylenediphenyl diisocyanate dissolved in 150 mL of benzene was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having urethane linkage of the following chemical formula 11e was prepared. The synthesis was confirmed by H-NMR analysis wherein the peak of hydrogen bound to the first carbon of the aliphatic chain adjacent to the terminal phenyl group in the following chemical formula 11e was observed at 2.75 ppm.

[Chemical formula 11e]

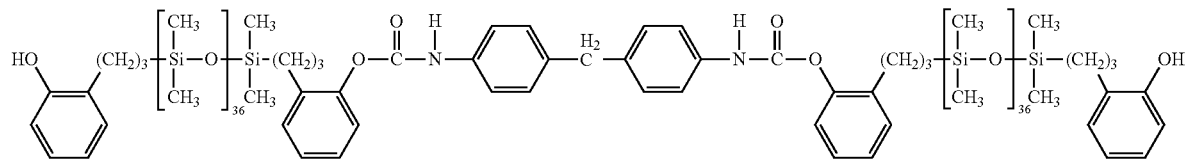

Example 14

Under nitrogen condition, 0.04 mol of monomer (BY16-799, Dow Corning) was dissolved in 100 mL of benzene, and then 4.4 mmol of 1,4-diazabicyclo[2,2,2]-octane was added thereto. With refluxing the resulting solution, 0.02 mol of 1,6-diisocyanatohexane dissolved in 100 mL of benzene was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having urethane linkage of the following chemical formula 11f was prepared.

[Chemical formula 11f]

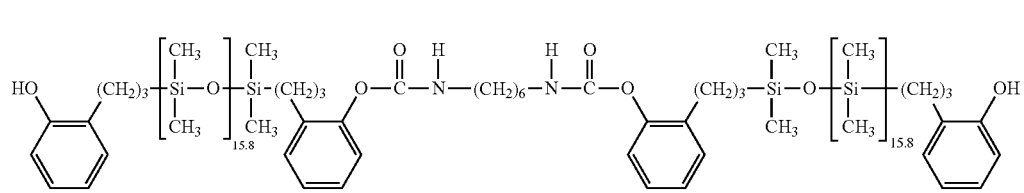

Example 15

According to the same method as Example 14 above, under nitrogen condition 0.02 mol of monomer (BY16-752, Dow Corning) was dissolved in 100 mL of benzene, and then 2.2 mmol of 1,4-diazabicyclo[2,2,2]-octane was added thereto. With refluxing the resulting solution, 0.01 mol of 1,6-diisocyanatohexane dissolved in 100 mL of benzene was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated siloxane having urethane linkage of the following chemical formula 11g was prepared.

[Chemical formula 11g]

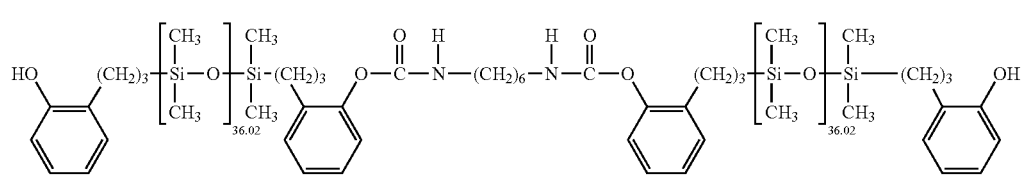

Preparation of Polysiloxane-Polycarbonate Copolymer

Example 16

Interfacial reaction of bisphenol A in an aqueous solution and phosgene gas was conducted in the presence of methylene chloride to prepare 400 mL of an oligomeric polycarbonate mixture having a viscosity average molecular weight of about 1,000. To the obtained oligomeric polycarbonate mixture, 1% by weight of the hydroxy-terminated siloxane having urethane linkage prepared in Example 9 which was dissolved in methylene chloride, 1.8 mL of tetrabutylammonium chloride (TBACl), 1.5 g of p-tert-butylphenol (PTBP) and 275 μl of triethylamine (TEA, 15 wt % aqueous solution) were admixed and reacted for 30 minutes. The reacted oligomeric polycarbonate mixture was kept for phase separation. After the phases were separated, only the organic phase was collected and thereto 170 g of an aqueous solution of sodium hydroxide, 370 g of methylene chloride and 300 μl of triethylamine (15 wt % aqueous solution) were admixed and reacted for 2 hours. After phase separation, the viscosity-increased organic phase was washed with alkali and separated. Next, the resulting organic phase was washed with 0.1N hydrochloric acid solution and then rinsed with distilled water 2 to 3 times repeatedly. After the rinse was completed, the concentration of the organic phase was adjusted constantly and then granulated by using a constant amount of pure water at 76° C. After the granulation was completed, the product was dried first at 110° C. for 8 hours and second at 120° C. for 10 hours. The properties of the prepared polysiloxane-polycarbonate copolymer were measured and are shown in the following Table 2. The synthesis of the copolymer was confirmed by H-NMR analysis wherein the peaks of methylene group and methoxy group of the polysiloxane were observed at 2.65 ppm and 3.85 ppm, respectively, and the peak of hydrogen of benzene ring was observed at 7.1-7.5 ppm.

Example 17

With using 5% by weight of the hydroxy-terminated siloxane having urethane linkage prepared in Example 9, the polysiloxane-polycarbonate copolymer was prepared by the same method as that of Example 16. The properties of the prepared polysiloxane-polycarbonate copolymer were measured and are shown in the following Table 2.

Example 18

With using 7% by weight of the hydroxy-terminated siloxane having urethane linkage prepared in Example 9, the polysiloxane-polycarbonate copolymer was prepared by the same method as that of Example 16. The properties of the prepared polysiloxane-polycarbonate copolymer were measured and are shown in the following Table 2.

Example 19

With using 10% by weight of the hydroxy-terminated siloxane having urethane linkage prepared in Example 9, the polysiloxane-polycarbonate copolymer was prepared by the same method as that of Example 16. The properties of the prepared polysiloxane-polycarbonate copolymer were measured and are shown in the following Table 2.

Example 20

With using 15% by weight of the hydroxy-terminated siloxane having urethane linkage prepared in Example 9, the polysiloxane-polycarbonate copolymer was prepared by the same method as that of Example 16. The properties of the prepared polysiloxane-polycarbonate copolymer were measured and are shown in the following Table 2.

Example 21

With using 5% by weight of the hydroxy-terminated siloxane having urethane linkage prepared in Example 10, the polysiloxane-polycarbonate copolymer was prepared by the same method as that of Example 16. The properties of the prepared polysiloxane-polycarbonate copolymer were measured and are shown in the following Table 2.

Example 22

With using 5% by weight of the hydroxy-terminated siloxane having urethane linkage prepared in Example 11, the polysiloxane-polycarbonate copolymer was prepared by the same method as that of Example 16. The properties of the prepared polysiloxane-polycarbonate copolymer were measured and are shown in the following Table 2.

Example 23

With using 5% by weight of the hydroxy-terminated siloxane having urethane linkage prepared in Example 12, the polysiloxane-polycarbonate copolymer was prepared by the same method as that of Example 16. The properties of the prepared polysiloxane-polycarbonate copolymer were measured and are shown in the following Table 2.

Example 24

With using 5% by weight of the hydroxy-terminated siloxane having urethane linkage prepared in Example 13, the polysiloxane-polycarbonate copolymer was prepared by the same method as that of Example 16. The properties of the prepared polysiloxane-polycarbonate copolymer were measured and are shown in the following Table 2.

Example 25

With using 5% by weight of the hydroxy-terminated siloxane having urethane linkage prepared in Example 14, the polysiloxane-polycarbonate copolymer was prepared by the same method as that of Example 16. The properties of the prepared polysiloxane-polycarbonate copolymer were measured and are shown in the following Table 2.

Example 26

With using 5% by weight of the hydroxy-terminated siloxane having urethane linkage prepared in Example 15, the polysiloxane-polycarbonate copolymer was prepared by the same method as that of Example 16. The properties of the prepared polysiloxane-polycarbonate copolymer were measured and are shown in the following Table 2.

Comparative Example 4

With using 10% by weight of the hydroxy-terminated siloxane having the above chemical formula 10, the polysiloxane-polycarbonate copolymer was prepared by the same method as that of Example 16. The properties of the prepared polysiloxane-polycarbonate copolymer were measured and are shown in the following Table 3.

Comparative Example 5

With using 15% by weight of the hydroxy-terminated siloxane having the above chemical formula 10, the polysiloxane-polycarbonate copolymer was prepared by the same method as that of Example 16. The properties of the prepared polysiloxane-polycarbonate copolymer were measured and are shown in the following Table 3.

(e) HDT (heat distortion temperature): The heat distortion temperature was measured by using an HDT test machine (6M-2, TOYOSEIKI Co. Ltd.) according to ASTM D638 with the load of 4.6 kg/cm².

(f) Abrasion amount: The abrasion amount was measured by using an abrasion test machine (5230 of TABER® INDUSTRIES, the load of 1,000 g, CS-17) according to time (12, 24 and 48 hours).

The present invention has been described with reference to concrete examples. A person skilled in the art could understand that the present invention can be realized as a modified

TABLE 2

| Properties | | Examples | | | | | | | | | | |
|---|---|---|---|---|---|---|---|---|---|---|---|---|
| | | 16 | 17 | 18 | 19 | 20 | 21 | 22 | 23 | 24 | 25 | 26 |
| Siloxane amount (wt %) | | 1 | 5 | 7 | 10 | 15 | 5 | 5 | 5 | 5 | 5 | 5 |
| Viscosity average molecular weight (Mv) | | 32000 | 30500 | 31800 | 29500 | 29600 | 30300 | 31700 | 30400 | 31000 | 31800 | 31300 |
| Impact strength (kgcm/cm) | Room temperature | 84 | 84 | 86 | 87 | 83 | 84 | 82 | 83 | 84 | 82 | 81 |
| | −50° C. | 34 | 59 | 60 | 62 | 59 | 58 | 58 | 57 | 59 | 52 | 53 |
| | Transmittance (%) | 90 | 82 | 81 | 78 | 73 | 81 | 83 | 82 | 81 | 81 | 80 |
| | Haze (%) | 2 | 27 | 29 | 32 | 39 | 25 | 27 | 24 | 28 | 26 | 24 |
| Abrasion amount (mg) | 12 hours | 7 | 6 | 4 | 4 | 5 | 6 | 7 | 6 | 6 | 5 | 7 |
| | 24 hours | 16 | 14 | 11 | 11 | 13 | 14 | 15 | 14 | 15 | 13 | 14 |
| | 48 hours | 32 | 27 | 25 | 23 | 26 | 27 | 30 | 31 | 27 | 25 | 32 |

TABLE 3

| Properties | | Comparative Examples | | | |
|---|---|---|---|---|---|
| | | 1 | 3 | 4 | 5 |
| Siloxane amount (wt %) | | 0 | 5 | 10 | 15 |
| Viscosity average molecular weight (Mv) | | 31200 | 30500 | 30200 | 30800 |
| Impact strength (kgcm/cm) | Room temperature | 85 | 83 | 79 | 77 |
| | −50° C. | 20 | 57 | 60 | 58 |
| | Transmittance (%) | 92 | 73 | 68 | 62 |
| | Haze (%) | 1 | 40 | 47 | 52 |
| Abrasion Amount (mg) | 12 hours | 12 | 8 | 7 | 9 |
| | 24 hours | 25 | 18 | 16 | 19 |
| | 48 hours | 65 | 35 | 33 | 34 |

As shown in Table 2 above, the polysiloxane having urethane linkage-polycarbonate copolymers prepared according to Examples 16 to 26 showed remarkably reduced abrasion amount as the time elapsed and excellent transparency. It can be known that they had much better properties than the polycarbonate resins and polysiloxane-polycarbonate copolymer prepared according to Comparative Examples 1 and 3 to 5.

The method for measuring the above properties used in Examples and Comparative Examples were as follows.

(a) H-NMR (nuclear magnetic resonance spectroscopy): This analysis was conducted by using Avance DRX 300 (Bruker)

(b) Viscosity average molecular weight: The viscosity of methylene chloride solution was measured by using Ubbelohde Viscometer at 20° C., and the limiting viscosity [η] therefrom was calculated according to the following equation.

$$[\eta] = 1.23 \times 10^{-5} Mv^{0.83}$$

(c) Transmittance and Haze: The transmittance and haze were measured by using a haze meter (HAZE-GARD PLUS, BYK GARDNER Co., Ltd.).

(d) Impact strength: The impact strength was measured by using an impact test machine (RESIL IMPACTOR, CEAST Co., Ltd.) at room temperature and −50° C.

form within a scope not departing from the essential characteristics of the present invention. Accordingly, the disclosed examples must be considered in their illustrative aspect and not limitative aspect. The scope of the present invention is shown not in the aforesaid explanation but in the appended claims, and all differences within a scope equivalent thereto should be interpreted as being included in the present invention.

The invention claimed is:
1. A hydroxy-terminated siloxane of the following chemical formula 1:

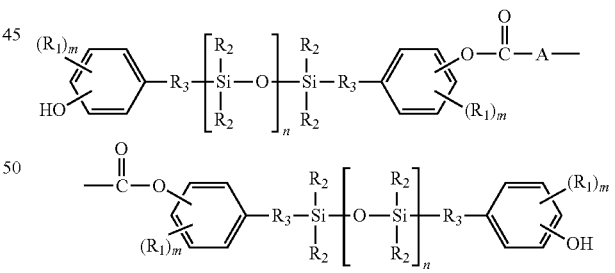

[Chemical formula 1]

wherein in the above chemical formula 1,
R$_1$ independently represents hydrogen atom, halogen atom, hydroxy group, alkyl group, alkoxy group or aryl group,
R$_2$ independently represents hydrocarbon group having a carbon number of 1 to 13 or hydroxy group,
R$_3$ independently represents alkylene group having a carbon number of 2 to 8,
A is X or NH—X—NH, where X represents linear or branched aliphatic group having a carbon number of 1 to 20, cycloalkylene group, or mono- or polycyclic arylene group that has a carbon number of 6 to 30 and is unsubstituted or substituted with halogen atom, alkyl group, alkoxy group, aryl group or carboxy group, m independently represents an integer of 0 to 4, and n independently represents an integer of 2 to 1,000.

2. The hydroxy-terminated siloxane according to claim 1, which is a reaction product of a siloxane of the following chemical formula 2 with an acyl compound or a diisocyanate compound of the following chemical formula 4:

[Chemical formula 2]

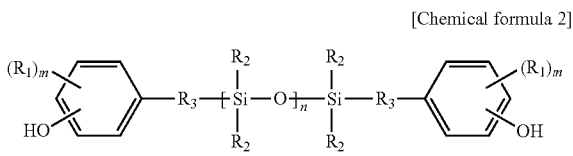

wherein in the above chemical formula 2, $R_1$ independently represents hydrogen atom, halogen atom, hydroxy group, alkyl group, alkoxy group or aryl group, $R_2$ independently represents hydrocarbon group having a carbon number of 1 to 13 or hydroxy group, $R_3$ independently represents alkylene group having a carbon number of 2 to 8, m independently represents an integer of 0 to 4, and n independently represents an integer of 2 to 1,000;

[Chemical formula 4]

wherein in the above chemical formula 4,

X represents linear or branched aliphatic group having a carbon number of 1 to 20, cycloalkylene group, or mono- or polycyclic arylene group that has a carbon number of 6 to 30 and is unsubstituted or substituted with halogen atom, alkyl group, alkoxy group, aryl group or carboxy group.

3. A polysiloxane-polycarbonate copolymer comprising, as repeating units, the hydroxy-terminated siloxane of claim 1 and a polycarbonate block of the following chemical formula 3:

[Chemical formula 3]

wherein in the above chemical formula 3, $R_4$ independently represents aromatic hydrocarbon group having a carbon number of 6 to 30 that is unsubstituted or substituted with alkyl group, cycloalkyl group, alkenyl group, alkoxy group, halogen atom or nitro group.

4. The polysiloxane-polycarbonate copolymer according to claim 3, wherein the amount of said hydroxy-terminated siloxane is from 0.5% to 20% by weight.

5. The polysiloxane-polycarbonate copolymer according to claim 3, which has a viscosity average molecular weight of from 15,000 to 150,000.

6. A method for preparing a polysiloxane-polycarbonate copolymer, the method comprising:

a step of reacting the hydroxy-terminated siloxane of claim 1 and an oligomeric polycarbonate under an interfacial reaction condition to form a polysiloxane-polycarbonate intermediate; and a step of polymerizing said intermediate by using a first polymerization catalyst.

7. The method for preparing a polysiloxane-polycarbonate copolymer according to claim 6, wherein the step to form said intermediate comprises a step of mixing said hydroxy-terminated siloxane and said oligomeric polycarbonate in a weight ratio of 0.5:99.5 to 20:80.

8. The method for preparing a polysiloxane-polycarbonate copolymer according to claim 6, wherein the step to form said intermediate comprises a step of forming a mixture comprising said hydroxy-terminated siloxane and said oligomeric polycarbonate, and the mixture further comprises a phase transfer catalyst, a molecular weight control agent and a second polymerization catalyst.

9. The method for preparing a polysiloxane-polycarbonate copolymer according to claim 6, wherein the step to form said intermediate comprises a step of forming a mixture comprising said hydroxy-terminated siloxane and said oligomeric polycarbonate; and after the reaction of said hydroxy-terminated siloxane and said oligomeric polycarbonate is completed, a step of extracting an organic phase from the resulting mixture;

and wherein the step of polymerizing said intermediate comprises a step of providing said first polymerization catalyst to the extracted organic phase.

10. The method for preparing a polysiloxane-polycarbonate copolymer according to claim 6, wherein said oligomeric polycarbonate has a viscosity average molecular weight of from 800 to 5,000.

* * * * *